UNITED STATES PATENT OFFICE.

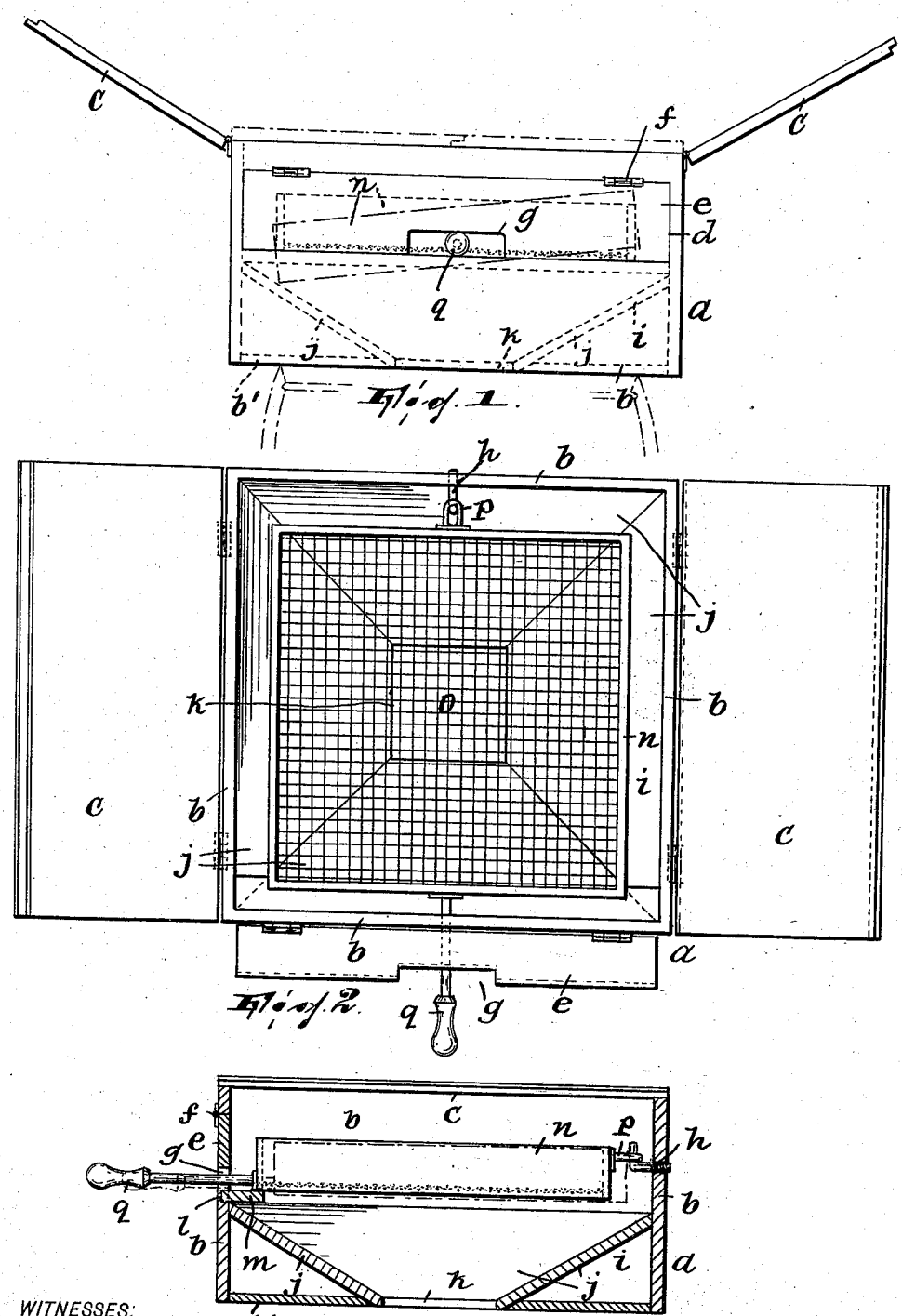

ADELE MANZO, OF PATERSON, NEW JERSEY.

ASH-SIFTER.

No. 881,601.  Specification of Letters Patent.  Patented March 10, 1908.

Application filed October 31, 1907. Serial No. 400,067.

*To all whom it may concern:*

Be it known that I, ADELE MANZO, a citizen of the United States, residing in Paterson, Passaic county, New Jersey, have invented a certain new and useful Improvement in Ash-Sifters; and I do hereby declare the following to be a full, clear, and exact description of the invention, such as will enable others skilled in the art to which it appertains to make and use the same, reference being had t he accompanying drawings, and to letters of reference marked thereon, which form a part of this specification.

My invention relates to ash sifters, and it consists in certain improvements having for their principal object to provide an ash sifter which shall be simple, strong and durable in construction, and relatively inexpensive to manufacture and which shall furthermore make it possible to sift ashes in such a manner as to entirely confine the dust and thus make the operation as clean as possible.

Referring to the accompanying drawing, Figure 1 is a front view of the improved device; Fig. 2 is a top plan view with the front door and the top leaves or covers open; and, Fig. 3 is a vertical sectional view taken substantially in the axis of the sifter proper.

In the drawings, $a$ designates a rectangular casing comprising side walls $b$, said casing being open at the top where it is provided with two leaves or covers $c$ for closing such opening and having a bottom wall $b'$. One of said side walls also has a laterally elongated opening $d$ which is closed by a door $e$ hinged at the top, as at $f$. This door has its lower middle portion cut away as at $g$, to form a slot. The opposite side wall of the casing carries a hook $h$ whose purpose will later appear. The casing $a$ incloses a hopper $i$ which is formed by four walls $j$ inclining inwardly from the side walls $b$ to an opening $k$ in the bottom wall $b'$. A horizontal rabbet $l$ may be formed on the inside surface of the wall $b$ of casing $a$ which is opposite that having the hook $h$, the top of this rabbet being coincident with the bottom of the opening $d$. Into the rabbet is fitted a shelf $m$; the inclined walls $j$ extend just under the shelf $m$ so that the two which rise at the ends of the shelf support it, as best shown in Fig. 3.

$n$ designates the sifter proper. This is a rectangular box having a wire netting or other foraminous bottom wall $o$ and provided on one side with an enlarged eye $p$ which receives the hook $h$ and on the opposite side with a handle $q$ adapted to project through the slot $g$. The sifter proper is of considerably less dimensions than the casing $a$. It will be observed that the eye $p$ is above a horizontal plane cutting the sifter centrally. It will also be observed that the handle $q$ is correspondingly below this plane.

In the operation of the device, the casing being arranged on the barrel supported by its bottom wall and the sifter proper being made to rest on the shelf $m$, the ashes are placed in the sifter and the covers $c$ closed, as is also the door $e$. The sifter is then oscillated laterally on its hook while resting on the shelf $m$. At this time, the eye $p$ being above the centrally horizontal plane of the sifter, the operation is facilitated because the described disposition of the axis of the sifter prevents it from any tendency toward top-heaviness if the sifter is slightly lifted, as it may be, from the shelf. When the sifting is complete, the door $e$ is opened and the sifter drawn out through the opening $d$ for the purpose of permitting the good coal to be selected from the bad, the door $e$ being again closed so as to confine the dust.

By disposing the handle $q$ below the centrally horizontal plane of the sifter $n$, and as close to the shelf $m$ as possible, the slot $g$ may be made of very limited width whereby to prevent any material escape of dust at that point.

Having thus fully described my invention, what I claim as new and desire to secure by Letters Patent is:

In an ash sifter, the combination of a casing open at top and bottom and comprising side walls, a hopper arranged in said casing and comprising walls inclining inwardly from the side walls of the casing and occupying the lower portion of the casing, a sifter proper having a handle on one side thereof below the centrally horizontal plane of the sifter and a pivotal support on the opposite side thereof and above said plane, one side wall of the casing having a sifter-admission opening and comprising a hinged door for said opening formed in its lower edge with a slot for the handle, and hinged covers or leaves adapted to close the casing at the top thereof, substantially as described.

In testimony, that I claim the foregoing, I have hereunto set my hand this 29th day of October, 1907.

ADELE MANZO.

Witnesses:
WM. D. BELL,
JOHN W. STEWARD.